(12) United States Patent
Lei et al.

(10) Patent No.: US 6,744,351 B2
(45) Date of Patent: Jun. 1, 2004

(54) CENTRAL RADIO DEVICE AND ASSOCIATED APPLIANCE

(75) Inventors: Luiz Lei, Sai Kung (HK); Chi Biu Wong, Kowloon (HK)

(73) Assignee: Litech Electronic Products Limited, Hong Kong (CN)

( * ) Notice: Subject to any disclaimer, the term of this patent is extended or adjusted under 35 U.S.C. 154(b) by 55 days.

(21) Appl. No.: 09/817,716

(22) Filed: Mar. 26, 2001

(65) Prior Publication Data

US 2002/0135495 A1 Sep. 26, 2002

(51) Int. Cl.[7] ............................................. H04M 15/00
(52) U.S. Cl. ...................... 340/310.01; 455/402; 368/46
(58) Field of Search ..................... 340/870.11, 310.01, 340/310.06, 825.22; 368/46, 47; 455/402, 507

(56) References Cited

U.S. PATENT DOCUMENTS

| 4,239,940 A | 12/1980 | Dorfman |
| 4,268,818 A | 5/1981 | Davis et al. |
| 4,287,597 A * | 9/1981 | Paynter et al. ............. 455/12.1 |
| 4,742,475 A | 5/1988 | Kaiser et al. |
| 4,952,905 A | 8/1990 | Oliver |
| 5,327,468 A | 7/1994 | Edblad et al. |
| 5,416,808 A | 5/1995 | Witsaman et al. |
| 5,781,852 A | 7/1998 | Gropper |
| 5,805,530 A * | 9/1998 | Youngberg ................... 368/47 |
| 5,828,751 A | 10/1998 | Walker et al. |
| 5,978,738 A | 11/1999 | Brown |

FOREIGN PATENT DOCUMENTS

CN         2326993 Y      6/1999

\* cited by examiner

Primary Examiner—Michael Horabik
Assistant Examiner—Hung Q Dang
(74) Attorney, Agent, or Firm—Brooks Kushman P.C.

(57) ABSTRACT

A radio system for use in a building within a range of an over-the-air radio broadcast timing signal that indicates a reference time includes a central radio device located at the building and having a radio receiver configured to receive the timing signal. The central radio device produces an output signal based on the timing signal. Each appliance has a clock, and receives the output signal. Each appliance sets the clock based on the central radio device output signal.

16 Claims, 3 Drawing Sheets

CENTRAL RADIO DEVICE AND ASSOCIATED APPLIANCE

TECHNICAL FIELD

The present invention relates to an appliance having a clock that is set automatically based on a radio frequency signal that is received by the appliance.

BACKGROUND ART

In some countries, there is a nationally broadcast radio frequency time signal. The time signal uses a standard format and indicates the current time as measured by an atomic clock. In the United States, the radio station WWVB broadcasts a standard timing signal at 60 kHz. The timing signal uses a predetermined format so that the signal may be recognized by radio controlled clocks. A radio controlled clock is a clock that includes a receiver for receiving the broadcast timing signal. The clock receives the signal and automatically sets itself. When a person buys a new radio controlled clock, the person must manually set the time zone. For example, in the United States, there are four different time zones, namely, Pacific Time, Central Time, Mountain Time, and Eastern Time. Some areas in the United States observe Daylight Savings Time while others do not. In any area, the person must manually set the time zone and manually correct the clock's automatic changes for daylight savings time if these changes are not observed in the particular area that the person lives. These radio controlled clocks are quite convenient in that the clocks automatically set themselves based on the broadcast timing signal, even though time zone and daylight saving time adjustment is sometimes required.

However, many of these radio controlled clock receivers have a disadvantage. The disadvantage is that the reception of the timing signal is often subject to interference. The interference may be caused by the location of the clock within a home or building, or by atmospheric influence. The major influences in a normal household or office environment are curtains in aluminum, electrical appliances which are not earthed, computers, televisions, and buildings reinforced with concrete or with a metallic front.

For the foregoing reasons, there is a need for a radio controlled clock that overcomes some of the reception problems associated with existing radio controlled clocks.

DISCLOSURE OF INVENTION

It is therefore an object of the present invention to provide a radio system, including a central radio device configured to receive the timing signal and send the timing information to any number of appliances having clocks.

In carrying out the above object and other objects and features of the present invention, a radio system for use in a building having a power distribution system including electrical wire carrying a building power signal is provided. The building is within a range of an over-the-air radio broadcast timing signal that indicates a reference time. The system comprises a central radio device and a plurality of appliances. The central radio device is located at the building and has a radio receiver configured to receive the timing signal. The central radio device produces an output signal based on the timing signal and is in communication with the building power distribution system wiring. The output signal is modulated onto the building power signal. Each appliance has a clock. Further, each appliance has a power connector that connects to the building power distribution system wiring. Each appliance has a decoder that decodes the modulated power signal to determine the central radio device output signal. Each appliance sets the clock based on the central radio device output signal. Alternatively, the central radio device output signal may be sent to the appliances over a wireless link or other type of link, although power line communication is preferred.

Preferably, the timing signal has a carrier frequency of between 50 kHz and 100 kHz. More preferably, the carrier frequency is about 60 kHz. Further, the timing signal preferably indicates the reference time as coordinated universal time.

In a preferred embodiment, the central radio device output signal indicates a shifted time that is shifted relative to the reference time based on a time zone of the central radio device. The central radio device further comprises a time zone selection mechanism that is operable by a user to select the time zone of the central radio device. The output signal is based on the timing signal and on the selected time zone. More preferably, the central radio device further comprises a daylight savings time selection mechanism that is operable by a user to select the status of daylight savings time of the central radio device; that is, select whether or not daylight savings time is to be observed. The output signal is based on the timing signal, the selected time zone and the status of daylight savings time. In preferred embodiments, the building power distribution system is an alternating current system and the central radio device modulates the output signal onto the alternating current system.

Further, in carrying out the present invention, a radio system for use in a building having a power distribution system including electrical wiring carrying a building power signal is provided. The building is within a range of an over-the-air radio broadcast timing signal that indicates a reference time. Further, the building is within a range of a weather radio signal. The system comprises a central radio device and a plurality of appliances. The central radio device is located at the building and has a radio receiver configured to receive the timing signal and the weather radio signal. The central radio device produces an output signal based on the timing signal and the weather radio signal. The central radio device is in communication with the building power distribution system wiring so as to modulate the output signal onto the building power signal. Each appliance has a clock, has a power connector that connects to the building power distribution system wiring, and has a decoder. The decoder decodes the modulated power signal to determine the central radio device output signal. The appliance sets the clock based on the central radio device output signal. Each appliance further includes an indicator that indicates a status of the weather radio signal. Preferably, each appliance further includes an amplifier circuit that amplifies the weather radio signal, and a driven speaker to allow a user to listen to the weather radio signal.

Preferably, the indicator that indicates the status of the weather radio signal is an alarm. More preferably, the weather radio signal preferably has a carrier frequency of between 162 MHz and 163 MHz. More preferably, the weather radio signal uses specific area message encoding (SAME). In a preferred implementation, the timing signal has a carrier frequency of between 50 kHz and 100 kHz. More preferably, the building power distribution system is an alternating current system and the central radio device modulates the output signal onto the alternating current system.

In preferred embodiments of the present invention, the system further comprises an outdoor temperature sensor having an output in communication with the central radio device. The central radio device output signal is further based on the temperature sensor output so as to indicate an outdoor temperature. Each appliance further includes a temperature indicator that indicates the outdoor temperature. Further, in preferred embodiments of the present invention, the system further comprises an outdoor humidity sensor. The humidity sensor has an output in communication with the central radio device. The central radio device output signal is further based on the humidity sensor output so as to indicate an outdoor humidity. Each appliance further includes a humidity indicator that indicates the outdoor humidity. In an alternative implementation, the system further includes a barometric pressure sensor having an output in communication with the central radio device. In turn, the central radio device output signal is further based on the barometric pressure sensor output, with each appliance including a barometric pressure indicator.

Even further, and in carrying out the present invention, a radio system for use in a building having an alternating current power distribution system including electrical wiring carrying a building power signal wherein the building is within a range of an over-the-air radio broadcast timing signal is provided. The timing signal has a carrier frequency of between 50 kHz and 100 kHz that indicates a reference time. The building is also within a range of a weather radio signal having a carrier frequency of between 162 MHz and 163 MHz. The system comprises a central radio device and a plurality of appliances. The central radio device is located at the building and has a radio receiver configured to receive the timing signal and the weather radio signal. The central radio device produces an output signal based on the timing signal and the weather radio signal and is in communication with the building power distribution system wiring so as to modulate the output signal onto the building power signal. The central radio device output signal indicates a shifted time that is shifted relative to the reference time based on a time zone of the central radio device. The central radio device includes a time zone selection mechanism that is operated by a user to select the time zone of the central radio device. Each appliance has a clock, has a power connector, and has a decoder. The power connector connects the appliance to the building power distribution system wiring. The decoder decodes the modulated power signal to determine the central radio device output signal. The appliance sets the clock based on the central radio device output signal. Each appliance further includes an indicator that indicates a status of the weather radio signal.

Still further, in carrying out the present invention, an appliance for use in a building having an alternating current power distribution system including electrical wiring carrying a building power signal is provided. The device has a clock, a power connector, and a decoder. The power connector connects to the building power distribution system wiring. The decoder decodes the modulated power signal to determine the central radio device output signal. The appliance sets the clock based on the central radio device output signal. The appliance further includes an indicator that indicates the status of the weather radio signal.

The advantages associated with embodiments of the present invention are numerous. For example, preferred embodiments of the present invention gather a timing signal, an emergency weather signal, an outdoor temperature signal, and an outdoor humidity signal, and transmit all of this information to a number of appliances through the existing alternating current power distribution system of a building or house or other structure. In preferred embodiments, the time zone and daylight savings time settings (observe or do not observe) may be selected at the central radio device so that it is not necessary to adjust each appliance. That is, the central device receives the broadcast timing signal and makes the time adjustment before transmitting the signal over the alternating current power lines to the appliances. For each appliance, the only thing that is needed to be done is to just plug the appliance into any standard outlet within the power distribution system and the clock will gather all information within about two minutes.

The above object and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
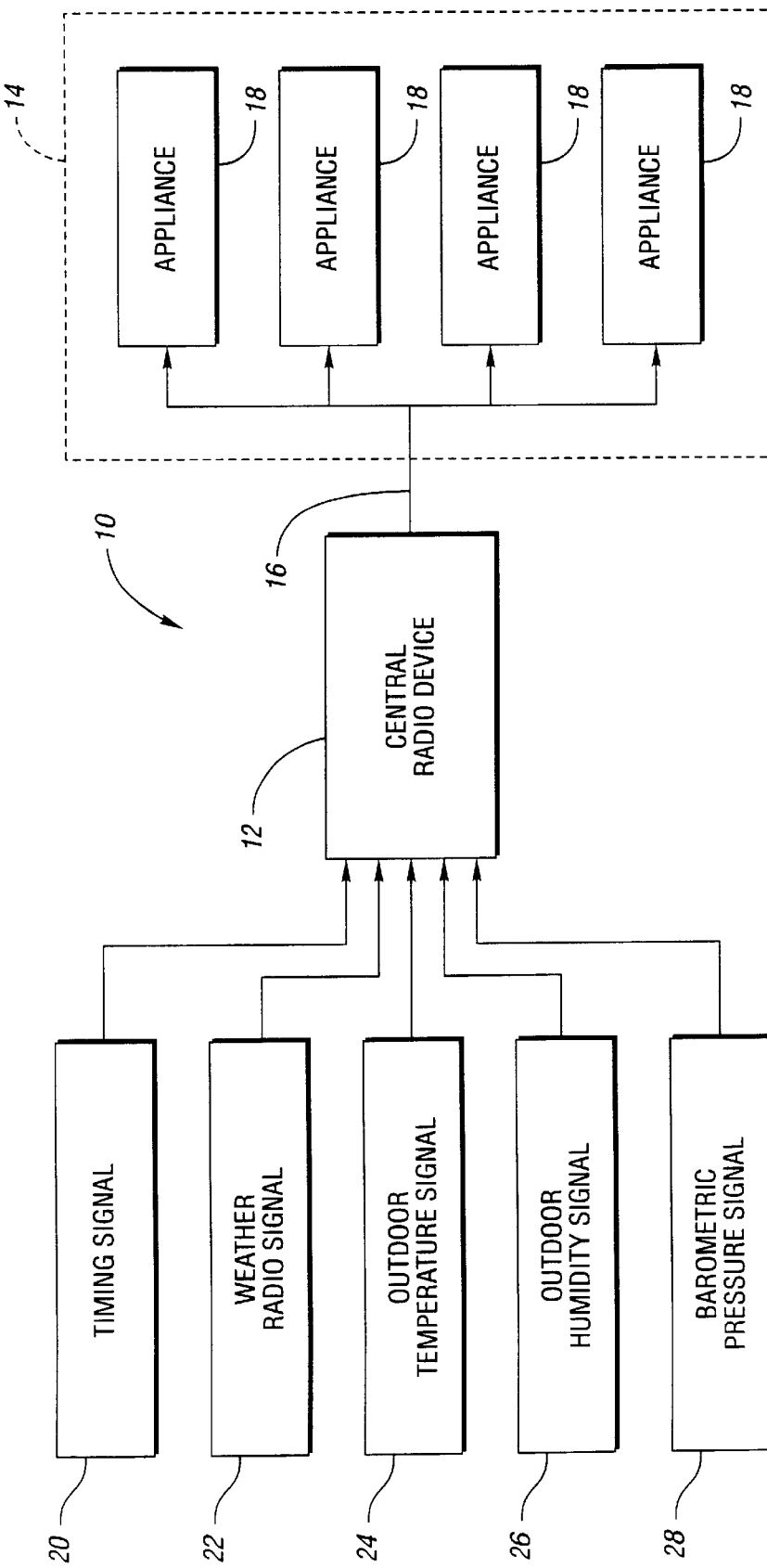
FIG. 1 is a diagram illustrating a system of the present invention.

Referring to FIG. 1, a system of the present invention is generally indicated at 10. A central radio device 12 gathers information from numerous sources. This information includes a timing signal 20, a weather radio signal 22, an outdoor temperature signal 24, an outdoor humidity signal 26 and optionally a barometric pressure signal 28. Timing signal 20 is preferably a nationally broadcast radio frequency signal that indicates a reference time such as a coordinated universal time. The timing signal preferably uses a well-known format and indicates the current year, day of the year, hour, minute, second, status of daylight savings time, presence of a leap year, and a leap second warning. A suitable timing signal is the nationally broadcast WWVB signal that is broadcast in the United States. Of course, other timing signals may be suitable so long as the format of the timing signal is known so that the central radio device may be configured appropriately.

The weather radio signal is preferably a broadcast emergency weather radio signal. A suitable weather radio signal is the United States National Weather Service Broadcast radio signal that is broadcast over seven different weather channels between 162 MHz and 163 MHz in the United States. A suitable weather signal may utilize specific area message encoding (SAME). The central radio device may employ any known techniques for analyzing the weather radio signal, and may optionally only transmit selected messages to the appliances. In the alternative, the central radio system may reproduce all messages received and transmit all messages to the appliances.

The outdoor temperature signal 24 indicates outdoor temperature near the building or house or other structure to central radio device 12, and the outdoor humidity signal 26 indicates the outdoor humidity near the building or house or other structure to the central radio device 12. Alternatively, a barometric pressure signal indicates barometric pressure to central radio device 12.

The information gathered by central radio device 12 is processed to generate an output signal that is modulated onto the building power signal over the power distribution system 16 within the building 14. In turn, appliances 18 may be connected to the power distribution system and receive the transmitted information from central radio device 12. Alternatively, a wireless link may be represented by number 16 and connect central radio device 12 and appliances 18 instead of utilizing the building power distribution system.

Figure 2:
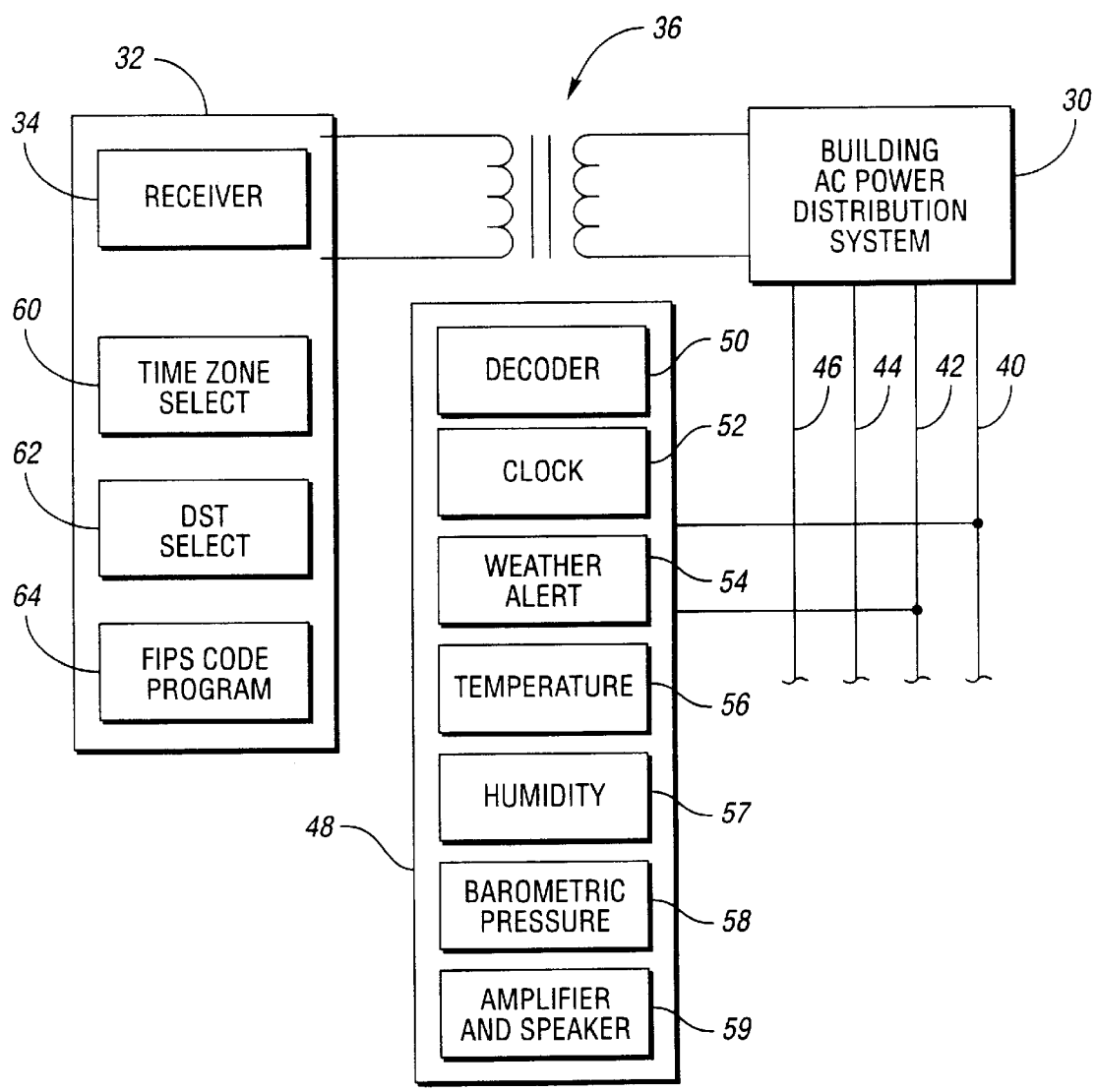
FIG. 2 is a diagram illustrating the central radio device, building power distribution system, and appliance in more detail.

As best shown in FIG. 2, a preferred central radio device 32 includes a receiver 34 that receives a suitable timing signal, a suitable weather radio signal, and optionally an outdoor temperature signal and outdoor humidity signal and barometric pressure signal. Any suitable technique is utilized to modulate the output signal of central radio device 32 onto the building power signal within building power distribution system 30. Distribution system 30 may be a 120 volt, 60 Hz alternating current power distribution system. As shown, transformer 36 allows central radio device 32 to modulate a signal onto the power distribution system. It is appreciated that power distribution system 30 may have any number of phases and a suitable three-phrase system is shown with neutral wire 40, and first, second, and third phases 42, 44, and 46, respectively. As such, central radio device 32 transmits information over each phase so that appliances 48 may be plugged into any phase of the power distribution system and receive the information. As shown, a suitable appliance 48 includes a decoder 50, a clock 52, a weather alert indicator 54, a temperature indicator 56, a humidity indicator 57, a barometric pressure indicator 58, and an amplifier and speaker 59 to allow the user to listen to an audio portion of the weather radio signal if desired.

Decoder 50 decodes the modulated power signal (wireless signal in the alternative) to determine the central radio device output signal and allow appliance 48 to set clock 52 based on the central radio device output signal. Weather alert indicator 54 sounds an alarm in the event of a weather alert. Temperature indicator 56, humidity indicator 57, and barometric pressure indicator 58 indicate the outdoor temperature, humidity, and barometric pressure, respectively, as received in the transmitted signal from central radio device 32.

In a preferred embodiment, a time zone selection mechanism 60, a Federal Information Processing System (FIPS) code programming mechanism 64, and a daylight savings time selection mechanism 62 are located on central radio device 32 so that the time zone and daylight savings time status may be set at the central radio device and, in turn, there is no need to set each individual appliance because central radio device 32 sends pre-adjusted information over the power lines.

From the foregoing description, it is appreciated that embodiments of the present invention gather a suitable timing signal such as the WWVB broadcast radio signal, a suitable weather radio signal such as the National Oceanic and Atmospheric Administration (NOAA) National Weather Service (NWS) weather radio signal, and the outdoor temperature and humidity signals (and optionally a barometric pressure signal), and transmit this information to appliances through a power distribution system of a building, house, or other structure. (Alternatively, a wireless link is used.) A preferred central radio device transmits all information from the WWVB timing signal (and adjusts the signal based on a time zone and daylight savings time status setting), as well as the unfiltered NOAA alert signal and the optional outdoor temperature and humidity signals. The preferred radio central device operates on a standard alternating current 120V, 60 Hz circuit. Both the temperature and humidity sensors preferably are capable of measuring a full range of temperatures and humidity. In addition, the preferred central radio device includes a liquid crystal display indicating, among other things, a field strength indication, and includes a first key for selecting the desired time zone and a second key for adjusting the status of daylight savings time. In addition, the preferred central radio device is capable of receiving all seven of the national weather service weather channels and is appropriately configured to handle specific area message encoding signals. Even further, the preferred central radio device has its own alert status indicator for a weather alert and is capable of transmitting the gathered information onto all three phases of a three-phase power distribution system.

The preferred appliance includes a clock that is automatically set based on the radio signal through the power line. The preferred clock displays the current hour, minute, second, year, month, day, day of week, outdoor temperature, outdoor humidity, time zone, daylight savings time status, and NOAA weather radio alert status. The preferred appliance includes a liquid crystal display and also has alarm functionality including snooze features. Other display types may also be suitable such as a light emitting diode display, quartz analog display, organic light emitting diode display, or any combination of different display types. Preferably, the normal alarm and the weather alert alarm are different alarms so that a listener can distinguish between a wake-up alarm and a weather alert. The liquid crystal display may be backlit and various traditional functional switches may be provided such as an alarm on/off switch and a temperature Celsius/Fahrenheit selection switch. In addition, a suitable communication scheme may be utilized over the power distribution system and preferably includes an automatic transmit power control (ATPC) scheme. Further, both the appliances and the central radio device preferably have battery backups.

It is appreciated that there may be many suitable timing signals and that a carrier frequency of between 50 kHz and 100 kHz is preferred. Further, the timing signal may indicate a coordinated universal time such as Greenwich Mean Time, but this is not required. Further, the appliance weather alert indicator may be merely an alarm that indicates the presence of an alert, or may include additional information about the alert, such as the audio weather radio signal that may be input to the amplifier to drive the speaker.

In a suitable implementation, the appliance has several settings for handling the weather alert signal. These settings are: off, alert, voice, and weather. When off is selected, the weather radio will be turned off and it will not respond to any alert signal. When weather is selected, the weather radio broadcast is continuously played through the appliance speaker. When voice is selected, the appliance sounds an alert for a few seconds when there is a weather alert, and then plays the weather radio broadcast for several minutes and afterward, returns to standby mode, awaiting the next alert signal. Preferably, an alert description is displayed on the display of the appliance until the alert's effective time expires. When alert mode is selected, the appliance sounds an alert and displays the alert description until the alert's effective time expires, but does not play the weather broadcast through the speaker as is done in the voice and weather modes.

Figure 3:
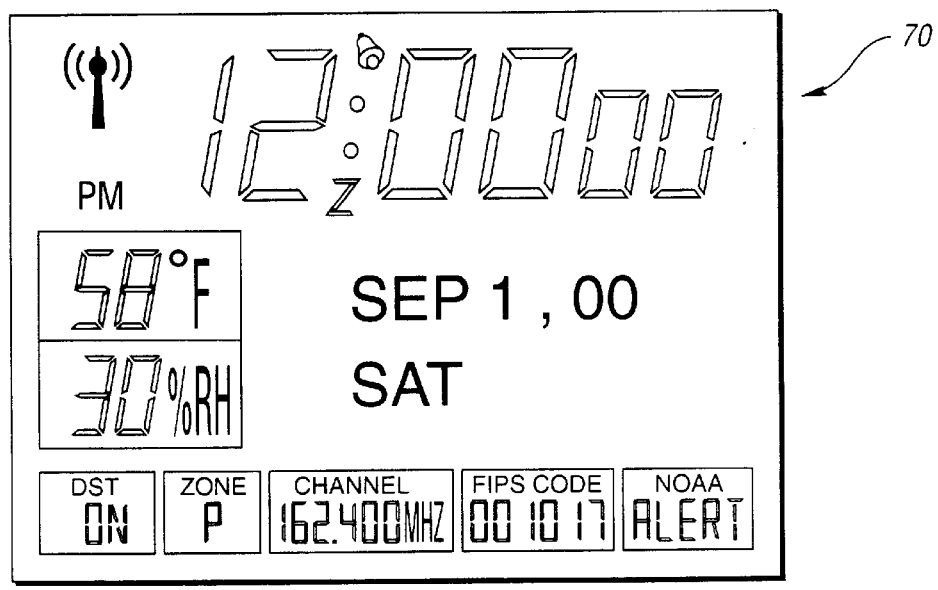
FIG. 3 is an exemplary display for use on the individual appliances.
Figure 4:
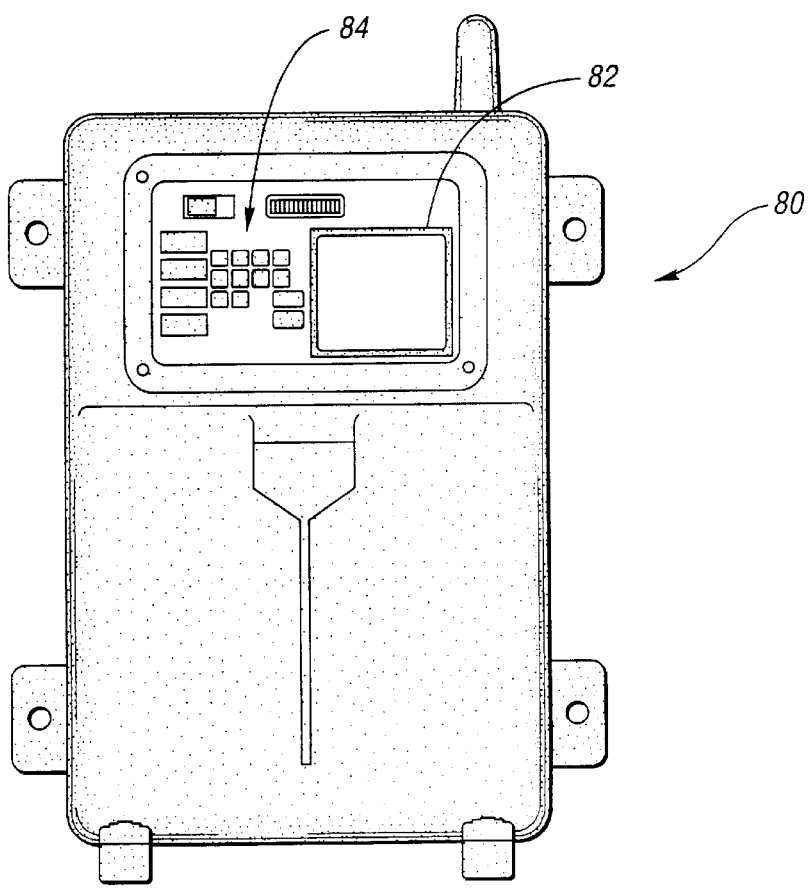
FIG. 4 is an exemplary central radio device.

In FIG. 3, an exemplary display for appliance 48 is generally indicated at 70. As shown, the exemplary display indicates time and date, temperature, humidity, as well as a daylight savings time status, time zone, selected weather radio channel, FIPS code, and weather radio mode (described above). And in FIG. 4, an exemplary central radio device is generally indicated at 80. The central radio device includes a suitable display 82 as well as a keypad 84 for changing settings of the central radio device as described above.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A radio system for use in a building having a power distribution system including electrical wiring carrying a building power signal wherein the building is within a range of a weather radio signal, the system comprising:

a central radio device located at the building and having a radio receiver configured to receive the weather radio signal, the central radio device producing an output signal based on the weather radio signal and being in communication with the building power distribution system wiring so as to modulate the output signal onto the building power signal; and a plurality of appliances, each appliance having a power connector that connects to the building power distribution system wiring, and having a decoder that decodes the modulated power signal to determine the central radio device output signal, wherein the appliance indicates a status of the weather radio signal.

2. The system of claim 1 wherein the building power distribution system is an alternating current system and wherein the central radio device modulates the output signal onto the alternating current system.

3. A radio system for use in a building having a power distribution system including electrical wiring carrying a building power signal wherein the building is within a range of an over the air radio broadcast timing signal that indicates a reference time and wherein the building is within a range of a weather radio signal, the system comprising:

a central radio device located at the building and having a radio receiver configured to receive the timing signal and the weather radio signal, the central radio device producing an output signal based on the timing signal and the weather radio signal and being in communication with the building power distribution system wiring so as to modulate the output signal onto the building power signal; and a plurality of appliances, each appliance having a clock, having a power connector that connects to the building power distribution system wiring, and having a decoder that decodes the modulated power signal to determine the central radio device output signal, wherein the appliance sets the clock based on the central radio device output signal, each appliance further including an indicator that indicates a status of the weather radio signal.

4. The system of claim 3 wherein the indicator is an alarm.

5. The system of claim 3 wherein the weather radio signal has a carrier frequency of between 162 MHz and 163 MHz.

6. The system of claim 5 wherein the weather radio signal uses specific area message encoding.

7. The system of claim 5 wherein the timing signal has a carrier frequency of between 50 kHz and 100 kHz.

8. The system of claim 7 wherein the building power distribution system is an alternating current system and wherein the central radio device modulates the output signal onto the alternating current system.

9. The system of claim 8 further comprising:

an outdoor temperature sensor having an output in communication with the central radio device, wherein the central radio device output signal is further based on the temperature sensor output so as to indicate an outdoor temperature, and wherein each appliance further includes a temperature indicator that indicates the outdoor temperature.

10. The system of claim 9 further comprising:

an outdoor humidity sensor having an output in communication with the central radio device, wherein the central radio device output signal is further based on the humidity sensor output so as to indicate an outdoor humidity, and wherein each appliance further includes a humidity indicator that indicates the outdoor humidity.

11. The system of claim 10 further comprising a barometric pressure sensor having an output in communication with the central radio device, wherein the central radio device output signal is further based on the barometric pressure signal output so as to indicate the barometric pressure, and wherein each appliance further includes a barometric pressure indicator that indicates the barometric pressure.

12. The system of claim 5 further comprising:

an amplifier and speaker for allowing a user to listen to an audio portion of the weather radio system.

13. A radio system for use in a building having an alternating current power distribution system including electrical wiring carrying a building power signal wherein the building is within a range of an over the air radio broadcast timing signal having a carrier frequency of between 50 kHz and 100 kHz that indicates a reference time, and wherein the building is within a range of a weather radio signal having a carrier frequency of between 162 MHz and 163 MHz, the system comprising:

a central radio device located at the building and having a radio receiver configured to receive the timing signal and the weather radio signal, the central radio device producing an output signal based on the timing signal and the weather radio signal and being in communication with the building power distribution system wiring so as to modulate the output signal onto the building power signal, the central radio device output signal indicating a shifted time that is shifted relative to the reference time based on a time zone of the central radio device wherein the central radio device includes a time zone selection mechanism that is operable by a user to select the time zone of the central radio device; and a plurality of appliances, each appliance having a clock, having a power connector that connects to the building power distribution system wiring, and having a decoder that decodes the modulated power signal to determine the central radio device output signal, wherein the appliance sets the clock based on the central radio device output signal, each appliance further including an indicator that indicates a status of the weather radio signal.

14. An appliance for use in a building having an alternating current power distribution system including electrical wiring carrying a building power signal wherein the building is within a range of an over the air radio broadcast timing signal having a carrier frequency of between 50 kHz and 100 kHz that indicates a reference time, and wherein the building is within a range of a weather radio signal having a carrier frequency of between 162 MHz and 163 MHz, wherein a central radio device located at the building has a radio receiver configured to receive the timing signal and the weather radio signal, the central radio device producing an output signal based on the timing signal and the weather radio signal and being in communication with the building power distribution system wiring so as to modulate the output signal onto the building power signal, the central radio device output signal indicating a shifted time that is shifted relative to the reference time based on a time zone of the central radio device wherein the central radio device includes a time zone selection mechanism that is operable by a user to select the time zone of the central radio device, the appliance comprising:

a device having a clock, having a power connector that connects to the building power distribution system wiring, and having a decoder that decodes the modulated power signal to determine the central radio device output signal, wherein the appliance sets the clock based on the central radio device output signal, the appliance further including an indicator that indicates a status of the weather radio signal.

15. A radio system for use in a building within a range of a weather radio signal, the system comprising:

a central radio device located at the building and having a radio receiver configured to receive the weather radio signal, the central radio device producing an output signal based on the weather radio signal; and a plurality of appliances, each appliance having a clock, each appliance receiving the output signal, wherein each appliance indicates a status of the weather radio.

16. The system of claim 15 wherein the output signal is transmitted form the central radio device to each appliance over a wireless link.

* * * * *